United States Patent [19]

Jay

[11] Patent Number: 5,025,932
[45] Date of Patent: Jun. 25, 1991

[54] SECURE BICYCLE RACK AND CARRIER

[76] Inventor: Lanny E. Jay, 723 #5 Laguna Canyon Rd., Laguna Beach, Calif. 92651

[21] Appl. No.: 470,369

[22] Filed: Jan. 25, 1990

[51] Int. Cl.$^5$ .............................................. A47F 7/00
[52] U.S. Cl. ........................................ 211/20; 211/5
[58] Field of Search ................ 211/5, 22, 17, 19, 20; 248/551; 70/58

[56] References Cited

U.S. PATENT DOCUMENTS

| 3,796,633 | 3/1974 | Goldstein | 214/450 |
| 3,853,255 | 12/1974 | Spencer | 224/42.03 B |
| 4,438,875 | 3/1984 | Fritsch | 224/42.03 R |
| 4,461,410 | 7/1984 | Tartaglia | 224/42.03 B |
| 4,676,414 | 6/1987 | Deguevara | 224/42.03 R |
| 4,804,120 | 2/1989 | Kraklin | 224/43.03 B |
| 4,823,997 | 4/1989 | Krieger | 224/42.03 B |

Primary Examiner—Alvin C. Chin-Shue
Assistant Examiner—Sarah A. Lechok
Attorney, Agent, or Firm—Baker, Maxham, Jester & Meador

[57] ABSTRACT

A bicycle rack for securing a bicycle against theft and/or for transporting comprises a base support member, an elongated vertically extending post member secured at a lower end to said base member and extending upwardly therefrom to a top end above the crank axle of a bicycle, the post member being tubular for receiving a crank arm, with an inner slot in an inner wall extending from the top for receiving the crank axle, and an outer slot in an outer wall for receiving a pedal shaft for positioning the pedal outside the post when the crank is received therein, a cap for receiving a lock, and a coupling shaft extending from the base for mounting into a hitch socket on a vehicle.

19 Claims, 2 Drawing Sheets

SECURE BICYCLE RACK AND CARRIER

BACKGROUND OF THE INVENTION

The present invention relates to bicycle racks and carriers and pertains particularly to an improved combined bicycle rack and carrier.

Existing bicycle or bike racks and carriers present two main problems. First of all they do not present or provide reasonable secure means to prevent theft of the bike. Secondly, they fail to provide simple and reasonably secure attachment to a vehicle.

Most bicycle carriers or racks for mounting on automobiles are mounted to the roof or to the rear bumper of the vehicle. These carriers are typically complex and have numerous clamps and brackets for attachment to various positions on the body of the automobile.

There have been bicycle racks developed recently which attach directly to and are supported by a trailer or towing hitch on the vehicle. However, these also have some drawbacks, most notably a lack of stability and security.

It is therefore desirable that an improved rack be available that is secure, stable and simple of construction and attachment.

SUMMARY AND OBJECTS OF THE INVENTION

It is the primary object of the present invention to overcome the aforementioned problems of the prior art.

In accordance with a primary aspect of the present invention, a bicycle rack comprises base support means, and locking means comprising elongated vertically extending post means means secured to and extending upwardly from said base means for receiving a crank arm, with inner slot means for receiving the crank axle, and outer slot means for receiving a pedal shaft for securing a bicycle in place. Another aspect of the invention includes means for mounting the rack to the towing hitch of a vehicle.

BRIEF DESCRIPTION OF THE DRAWING

The above and other objects and advantages of the present invention will become apparent from the following description when read in conjunction with the accompanying drawings wherein.

DETAILED DESCRIPTION OF A PREFERRED EMBODIMENT

Figures 1, 2:
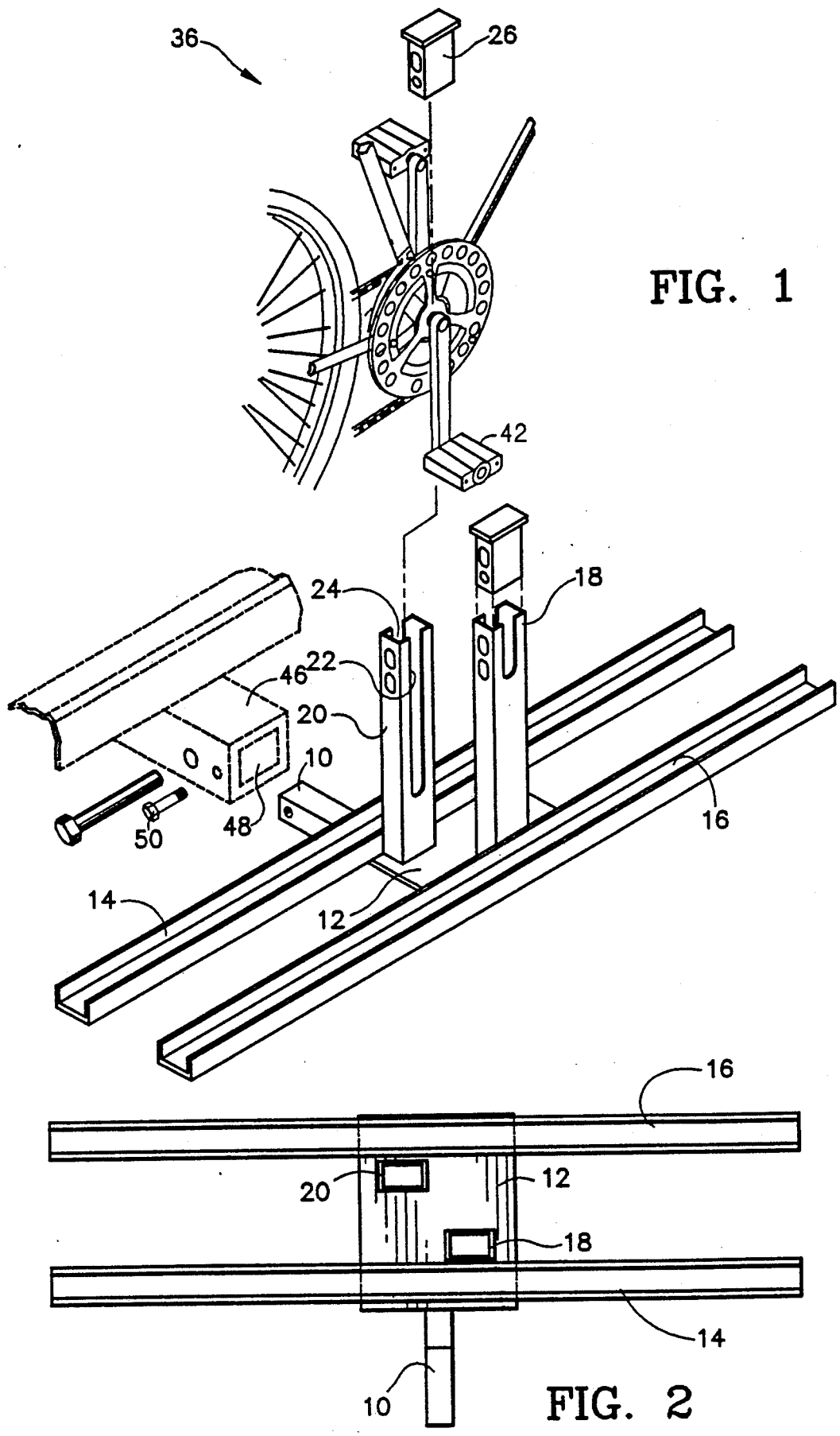
FIG. 1 is a perspective view illustrating a preferred embodiment of the invention.
FIG. 2 is a top plan view of the embodiment of FIG. 1.
Figure 3:
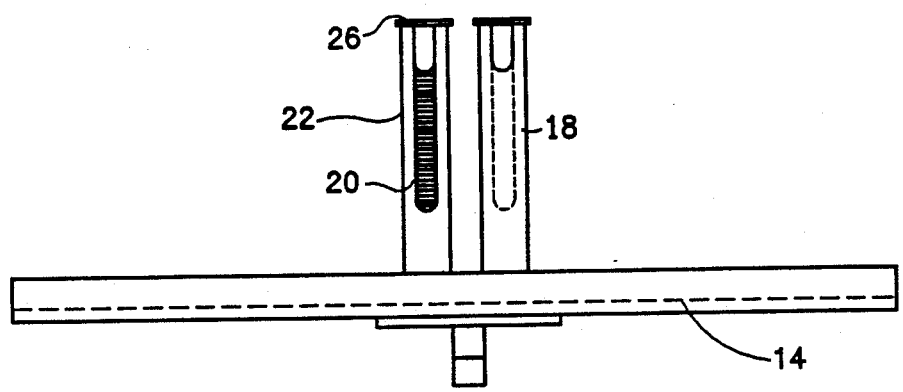
FIG. 3 is a front elevation view of the embodiment of FIG. 1.

Referring to FIGS. 1 and 2 of the drawing, there is illustrated a bicycle rack and carrier in accordance with the present invention. A portion of a bicycle, designated generally by the numeral 36, is illustrated with the crank and pedal assembly positioned to be received in the lock post 20. The rack and carrier is designed to attach to the rear of a vehicle directly to the hitch mount structure on the back of an automobile. It is designed so that the entire rack and bicycles are entirely supported solely bv the towing hitch structure, without the necessity for either attachment brackets, clamps or the like being attached o secured to other portions of the vehicle.

Referring specifically to FIG. 1, a rack in accordance with the invention is illustrated in a perspective view. The illustrated structure comprises a hitch post member or bar 10, secured to and extending forward from a base plate member 12, for insertion into a square tubular socket of a hitch mount 46. Current hitch mounts on the back of automobiles have a frame portion attached to the under frame of the vehicle, with a rearwardly projecting usually square tubular post 46 forming a rearwardly directed socket 48 for receiving a square hitch post with a typical ball or other trailer type hitch coupling thereon. The hitch post is removable from the socket when not in use. The present bike carrier and rack is adapted to mount directly to that socket by means of the forwardly extending post 10.

The bike carrier or rack, in accordance with the invention, has a solid hitch post or bar 10 extending forward from a base plate 12, as can be seen in the top view (FIG. 2), for extending into and detachably connecting into the socket 48 of the hitch assembly 46. The hitch post 10 will be a one-quarter inch steel tube for a two inch hitch, and solid bar for a one and one-quarter inch hitch. Means may be provided, such as cams and screws for engaging and biasing the post 10 for insuring a snug and secure fit within the socket so that the rack is stable and secure.

Figure 4:
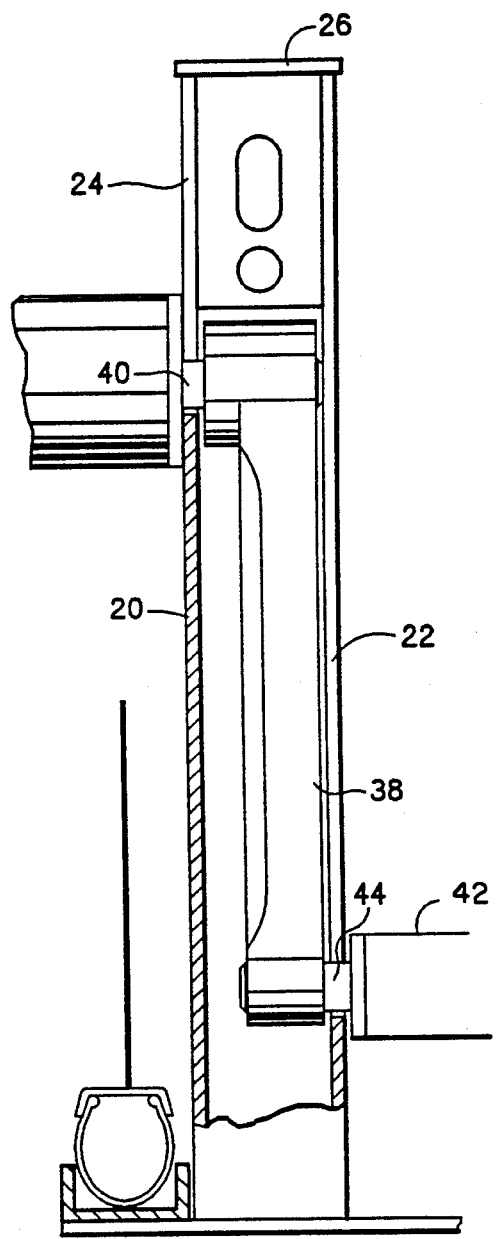
FIG. 4 is an enlarged detailed view partially in section illustrating details of the crank lock feature.
Figure 5:
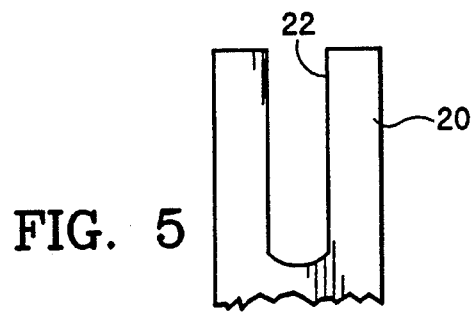
FIG. 5 is an enlarged detailed view illustrating the crank axle receiving slot of the crank lock post.
Figure 6:
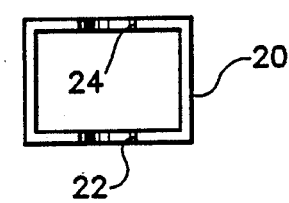
FIG. 6 is an enlarged detailed top plan view illustrating the top of the crank lock post.
Figure 7:
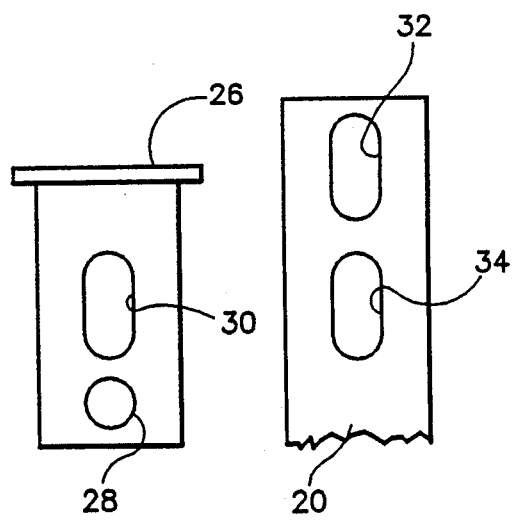
FIG. 7 is an enlarged detailed side elevation view illustrating the lock cap.
Figure 8:
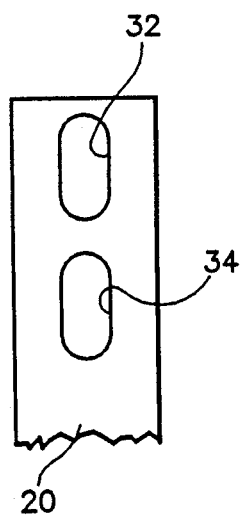
FIG. 8 is an enlarged detailed side elevation view illustrating the lock receiving bores in the top of the lock post.

A pair of wheel receiving channel rails 14 and 16 extend transverse to the hitch post 10 and are mounted to and supported directly on the base plate 12. These channels are to receive the wheels of a bicycle (FIG. 4). A pair of crank receiving lock post members 18 and 20 are secured at the lower end directly to the base plate 12, such as by welding or the like, and extend directly upward therefrom. These posts are preferably square or rectangular tubular members slotted on the side facing toward and the side facing away from the respective wheel channels for receiving the crank axle and pedal shaft of a bicycle. These posts serve to secure and lock the bicycle in place on the carrier assembly.

A post 18 is associated with channel 14, and a post 20 is associated with channel 16, and are longitudinally offset along the axis of the channels to accommodate closer spacing of the channels with bikes therein. As can be seen in FIGS. 1 and 4, the post 20 has a short slot 24 in the wall thereof facing and adjacent to the channel 16, and an elongated slot 22 in the wall of the post away from the channel 16. The post 18 is similarly constructed to accommodate the crank of a bicycle in channel 14.

As can be seen in FIGS. 1 and 2, the upwardly extending posts are square hollow tube members, with slots 22 and 24 formed in the walls on the sides directly adjacent (inner wall) and opposite (outer wall) the respective channels. The posts are provided with a long slot 22 in the outer wall opposite the channel 16, and a short slot 24 in the inner wall adjacent to channel 16.

Referring to FIG. 4, the tubular post 20 is adapted to receive a crank arm 38, the short slot 24 receives the axle 40, and the long slot 22 away from the channel is adapted to receive the pedal shaft 44 to permit the pedal 42 to extend outward from the post. A bike to be placed in channel 16 is lifted above and positioned over the rack (FIG. 1), and lowered such that the crank is extended into the upwardly extending post 20 (FIG. 4). The crank arm 38 is positioned with the pedal 42 extending beyond slot 22 to the outside of the post 20, and the shaft or axle 44 of the pedal extending downward along the slot 22 while the crank journal or axle 40 extends into slot 24.

Once the bike is in place, a cap 26, as shown in FIG. 4, is inserted down into the upper end of the post 20, with the lower end of the cap engaging the crank axle and then secured in place by a thumb screw extending through a hole in the post. Slots formed in the cap and in the upper end of the post are adapted to align and to receive a suitable lock device, such as a padlock or a cable. For most bikes, if the rack suitably fits the bike and pulls it and locks it securely against and into the channels, the bike is secured without the necessity of cables and the like. Most bikes require that the front wheel be loosened and pulled downward out of the forks to be removed. With the bike secured snugly against the channel, the front wheel cannot be removed.

Most modern bikes also require that the rear wheel be moved forward and down out of its slot from the frame to remove it. Similarly, it may also be restrained in the rack against removal by the channels.

In addition, a cable slot 30 is provided in the side of the post 20, which corresponds or aligns with a cable slot 32 within the upper end of the post. An elongated slot or bore 34 also accommodates various positioning vertically of a thumb screw (not shown) threadably extending into bore 28 of the cap 26. The cable slot permits the use of the cable to provide additional security, such that the cable 10 extends through the slot and through the wheels and frame of the bike to provide additional security.

While the channels 14 and 16 are preferred in the overall arrangement, the center post locking configuration can be utilized without the channels. Such an arrangement would be wherein the base plate is secured to a suitable supporting surface, such that the wheels of the bicycle are preferably supported on a support surface. While it is not essential that the bike be supported on such a surface, it is preferable for stability and other reasons. For example, the base plate may be secured in the bed of a truck or van, such that multiple posts may be secured for the securing of multiple bikes within a truck or van. It may also be secured on a concrete pad or the like to provide a stationary security rack.

While I have illustrated and described m invention by means of specific embodiments, it is to be understood that numerous changes and modifications may be made therein without departing from the spirit and scope of the invention as defined in the appended claims.

I claim:

1. A bicycle rack having means for securing a bicycle against theft comprising:
   a base support member; and
   an elongated vertically extending post member secured at a lower end to said base member and extending upwardly therefrom to a top end terminating at a position above the height of a crank axle of a bicycle to be secured therein, said post member being tubular for receiving a crank arm therein, with an inner slot in an inner wall extending from said top for receiving a crank axle, and an outer slot in an outer wall for receiving a pedal shaft for positioning a pedal outside the post member when the crank arm is received therein.

2. A bicycle rack in accordance with claim 1 wherein said base member includes an upwardly opening channel for receiving the wheels of a bicycle in an upright position.

3. A bicycle rack in accordance with claim 1 wherein said post includes a detachable cap for fitting on the top thereof and for receiving lock means for securing a bicycle therein.

4. A bicycle rack in accordance with claim 1 wherein said post is square in configuration, said inner slot is formed in one side thereof and said outer slot is formed in an opposite side thereof.

5. A bicycle rack in accordance with claim 1 wherein said base includes a forwardly extending bar for mating with a hitch bar on the rear of a vehicle.

6. A bicycle rack in accordance with claim 5 wherein said forwardly extending bar is square for mating with a square hitch socket.

7. A bicycle rack in accordance with claim 1 wherein said base comprises a pair of upwardly opening channels disposed side by side and extending generally parallel, each channel for receiving the wheels of a bicycle in an upright position.

8. A bicycle rack in accordance with claim 7 wherein said post is square in configuration, said inner slot is formed in one side thereof and said outer slot is formed in an opposite side thereof.

9. A bicycle rack in accordance with claim 8 wherein said base includes a forwardly extending bar for mating with a hitch bar on the rear of a vehicle.

10. A bicycle rack in accordance with claim 9 wherein said forwardly extending bar is square for mating with a square hitch socket.

11. A bicycle rack having means for securing a bicycle against theft comprising:
    a base support member; and
    an elongated vertically extending post member secured at a lower end to said base member and extending upwardly therefrom to a top end above the height of a crank axle of a bicycle to be secured therein, said post member being tubular for receiving a crank arm therein, with an inner slot in an inner wall extending from said top for receiving the crank axle, and an outer slot in an outer wall for receiving a pedal shaft for positioning a pedal thereon outside the post when the crank arm is received therein, and means for locking the crank arm in the post member.

12. A bicycle rack in accordance with claim 11 wherein said base member includes an upwardly opening channel for receiving the wheels of a bicycle in an upright position.

13. A bicycle rack in accordance with claim 12 wherein said base includes a forwardly extending bar for mating with a hitch bar on the rear of a vehicle.

14. A bicycle rack in accordance with claim 13 wherein said forwardly extending bar is square for mating with a square hitch socket.

15. A bicycle rack in accordance with claim 14 wherein said post is square in configuration, said inner slot is formed in one side thereof and said outer slot is formed in an opposite side thereof.

16. A bicycle rack having means for securing a bicycle against theft comprising:
- a base support member including a forwardly extending bar for mating with a hitch bar on the rear of a vehicle;
- a pair of upwardly opening channels disposed side by side on said base and extending generally parallel, each channel for receiving the wheels of a bicycle in an upright position;
- an elongated vertically extending tubular post member secured at a lower end to said base member and extending upwardly therefrom to a top end at a position above the height of a crank axle of a bicycle, said post member being open for receiving a crank arm therein with an inner slot in an inner wall extending from said top end for receiving a crank axle, and an outer slot in an outer wall for receiving a pedal shaft for positioning a pedal outside the post member when the crank arm is received therein; and
- means for locking the crank arm in the post member.

17. A bicycle rack in accordance with claim 16 wherein said forwardly extending bar is square for mating with a square hitch socket.

18. A bicycle rack in accordance with claim 17 wherein said post is square in configuration, said inner slot is formed in one side thereof and said outer slot is formed in an opposite side thereof.

19. A bicycle rack in accordance with claim 16 wherein said post is square in configuration, said inner slot is formed in one side thereof and said outer slot is formed in an opposite side thereof.

* * * * *